United States Patent
Hale

[19]

[11] Patent Number: 6,151,907
[45] Date of Patent: Nov. 28, 2000

[54] MISTING SYSTEM FOR VEHICLE

[76] Inventor: Roger G. Hale, 7305 Vanessa Dr., Fort Worth, Tex. 76112

[21] Appl. No.: 09/407,360

[22] Filed: Sep. 29, 1999

[51] Int. Cl.[7] ....................................................... F28D 5/00
[52] U.S. Cl. ................................. 62/314; 62/304; 62/306
[58] Field of Search ............................... 62/314, 304, 306

[56] References Cited

U.S. PATENT DOCUMENTS

| | | | |
|---|---|---|---|
| 2,114,558 | 4/1938 | Dismukes | 20/40.5 |
| 2,665,171 | 1/1954 | Stievater | 299/104 |
| 2,727,366 | 12/1955 | Hagen | 62/139 |
| 3,583,174 | 6/1971 | Logue | 62/309 |
| 3,738,621 | 6/1973 | Anderson | 261/29 |
| 4,360,368 | 11/1982 | Lyon | 55/259 |
| 4,658,597 | 4/1987 | Shum | 62/235.1 |
| 4,708,088 | 11/1987 | Purvis et al. | 118/300 |
| 4,807,813 | 2/1989 | Coleman | 239/153 |
| 5,005,367 | 4/1991 | Hwang | 62/133 |
| 5,046,449 | 9/1991 | Nelson | 118/315 |
| 5,112,535 | 5/1992 | Roberson | 261/67 |
| 5,285,654 | 2/1994 | Ferdows | 62/304 X |
| 5,337,960 | 8/1994 | Allen | 239/280.5 |
| 5,373,703 | 12/1994 | Pal | 62/91 |
| 5,441,202 | 8/1995 | Wintering et al. | 239/267 |
| 5,613,371 | 3/1997 | Nelson | 62/244 |
| 5,724,824 | 3/1998 | Parsons | 62/304 X |

FOREIGN PATENT DOCUMENTS

| | | |
|---|---|---|
| 2653073 | 4/1991 | France . |
| 2669407 | 5/1992 | France . |
| 1266016 | 10/1989 | Japan . |
| 4201618 | 7/1992 | Japan . |

OTHER PUBLICATIONS

Print out of web page advertising Misty Mate Pump, Blue Moon Mister and Twist & Mist, 2 pages.

*Primary Examiner*—Denise L. Ferensic
*Assistant Examiner*—Chen-Wen Jiang
*Attorney, Agent, or Firm*—Geoffrey A. Mantooth

[57] ABSTRACT

A misting system has a reservoir for containing water. Misting nozzles are in communication with the reservoir. Water is forced out of the reservoir and through the nozzles by compressed gas. The gas can be supplied in contact with the water by an external air cylinder. Alternatively, the gas can inflate a bladder or diaphragm located inside of the reservoir. The misting system is for use on vehicles of all types and can be located in the roof or ceiling of such vehicles. The misting nozzles can be located in the wall of the reservoir.

9 Claims, 6 Drawing Sheets

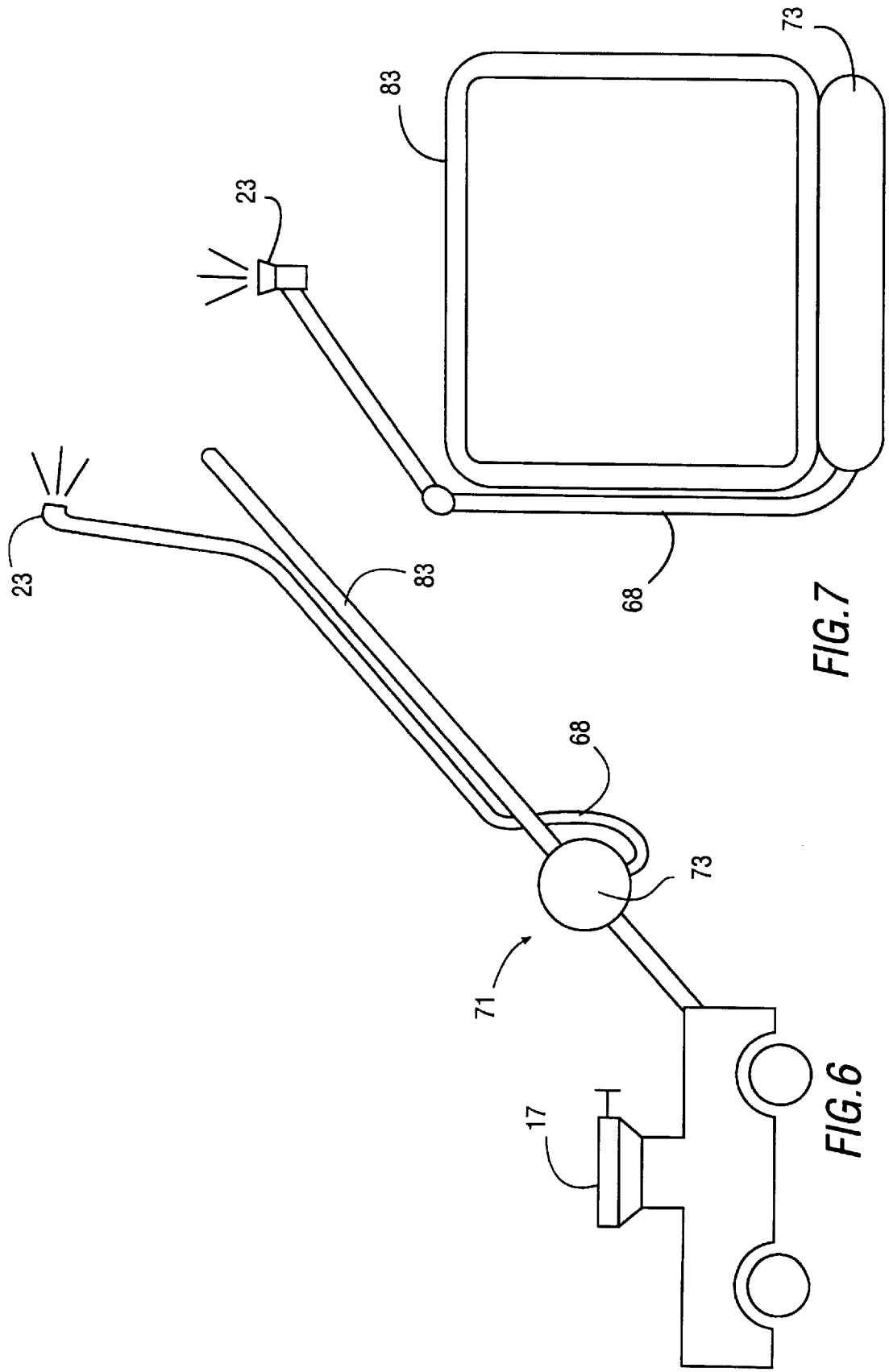

MISTING SYSTEM FOR VEHICLE

SPECIFICATION

1. Field of the Invention

The present invention relates to systems for cooling the occupants of vehicles.

2. Background of the Invention

Hot climates can make outdoor activities unbearable. Some people just avoid being outside altogether. Others, who have no choice, simply have to bear it and subject themselves to heat related illnesses.

For those who are outside during the heat of the day, some relief can be obtained by finding shade to avoid direct sunlight. But even finding shade may be insufficient, especially if the temperature in the shade is 100 degrees F. or higher.

There are a variety of ways to stay cool when outside. One of the least expensive is the use of a misting system. A misting system produces a fine mist of water. The mist enhances evaporative cooling of the skin.

It is desirable to locate a misting system on a vehicle such as a tractor or golf cart. These vehicles typically have passenger compartments that are open to the outside.

There are many prior art misting systems, ranging from hand held hand squeezed pumps to electric pump operated systems found in Nelson, U.S. Pat. No. 5,613,371. These misting systems suffer from several disadvantages such as being too hard to use or too expensive.

SUMMARY OF THE INVENTION

It is an object of the present invention to provide a misting system for a vehicle that is inexpensive to manufacture.

It is another object of the present invention to provide a misting system for a vehicle that is easy to use.

The present invention provides a misting system for a vehicle. The misting system has a supply of compressed gas. The supply of compressed gas further comprises a gas bottle. Their is a reservoir that is capable of containing a supply of water. The reservoir is coupled to the vehicle and the gas bottle is attached to the reservoir. A misting nozzle is in fluid communication with the reservoir. A valve is in fluid communication with the misting nozzle for controlling the flow of water through the misting nozzle. The compressed gas acts on the water in the reservoir so as to expel some of the water going through the misting nozzle when the valve is opened.

In accordance with one aspect of the present invention, the reservoir comprises rigid walls.

In accordance with another aspect of the present invention, there is an air pressure regulator located between the supply of compressed gas and the reservoir.

In accordance with still another aspect of the present invention the misting nozzle is located through a wall of the reservoir.

In accordance with still another aspect of the present invention, the reservoir has a fill port for adding water thereto. There is a filter located in the fill port.

In accordance with still another aspect of the present invention, the vehicle is a golf cart, a tractor or a push lawn mower.

The present invention also provides a misting system for a vehicle, which vehicle comprises a passenger space and a canopy or roof covering the passenger space. There is a reservoir that is capable of containing a supply of water. The reservoir is located underneath the canopy and above the passenger space. A misting nozzle is located so as to direct a mist of water onto the passenger space. The misting nozzle is in fluid communication with the reservoir. A supply of compressed gas is in fluid communication with the reservoir so as to force water in the reservoir out through the misting nozzle.

In accordance with one aspect of the invention, the reservoir has a wall with the misting nozzle being located in the wall so as to penetrate therethrough.

The present invention also provides a misting system for a vehicle. The misting system has a reservoir that is capable of containing a supply of water. The reservoir is coupled to the vehicle. A misting nozzle is in fluid communication with the reservoir. An elastomeric diaphragm is located inside of the reservoir that forms a sealed chamber capable of containing compressed gas therein. The diaphragm is expandable and contractible to fill varying volumes within the reservoir. An air port through an outside wall of the reservoir communicates with the sealed chamber.

BRIEF DESCRIPTIONS OF THE DRAWINGS

FIG. 6 is a side schematic view of a push type lawn mower, equipped with the misting system.

FIG. 7 is a front view of the misting system of FIG. 6.

DESCRIPTION OF THE PREFERRED EMBODIMENT

Figure 1:
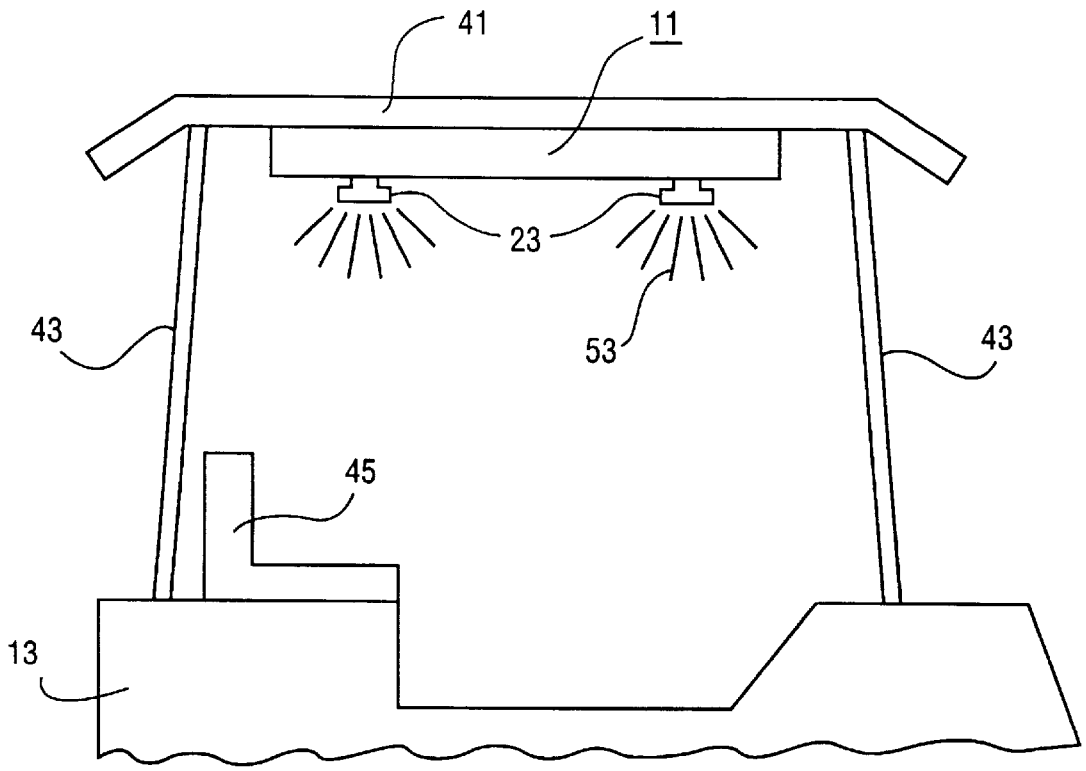
FIG. 1 is a schematic cross-sectional view of a vehicle, equipped with the misting system of the present invention, in accordance with a preferred embodiment.
Figure 2:
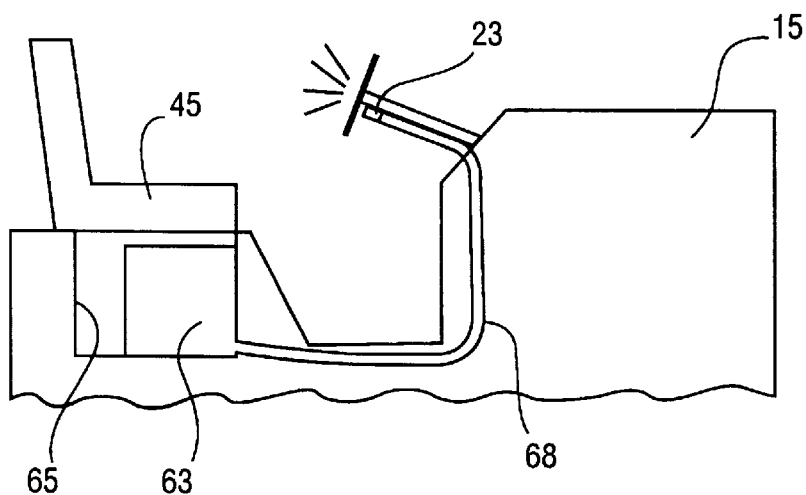
FIG. 2 is a schematic view of another vehicle equipped with the misting system of the present invention in accordance with another embodiment.
Figure 3:
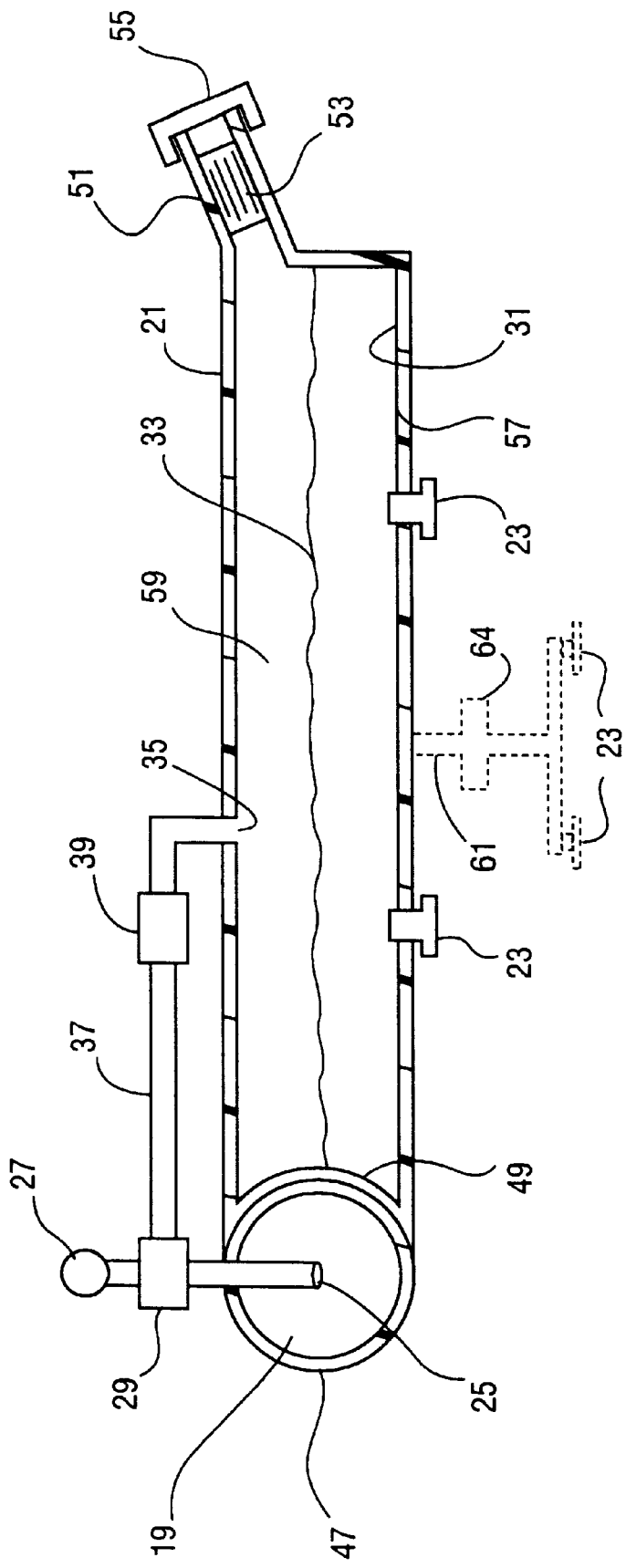
FIG. 3 is a schematic view of the misting system of FIG. 1.

In FIGS. 1 and 3, there is shown a misting system 11 of the present invention, in accordance with a preferred embodiment, as mounted onto a vehicle 13. The vehicle 13 shown can be a golf cart or a tractor. The misting system of the present invention can be used on other vehicles, such as a riding lawn mower 15 (FIG. 2). The misting system can even be used on vehicles that are not self powered, such as a push type lawn mower 17 (FIGS. 6 and 7).

The misting system delivers upon demand a fine spray or mist of water onto the occupants of the vehicle. The water mist cools the occupant through evaporation, making the heat of the outdoors much more bearable.

The misting system can be used on vehicles that are operated indoors, such as forklifts. Forklifts operate within warehouses and other buildings, many of which are unairconditioned.

Referring to FIG. 3, the misting system 11 generally includes a supply 19 of compressed gas, a reservoir 21 and one or more misting nozzles 23.

The supply of compressed gas is an air cylinder 19 capable of holding compressed air. Such air cylinders 19 are conventional and commercially available. The air cylinder 19 has a charging/discharging port 25 with a valve. The valve is opened and closed manually with a handle. Air cylinders are available in a variety of capacities (for example, 6–100 cubic feet) and pressures (for example, 2300–3500 psi). The air cylinder 19 has a pressure gauge 27. An air pressure regulator 29 couples to the charging/discharging port 25 of the air cylinder. The regulator 29 reduces the pressure to a level that is acceptable to the user and to the reservoir 21.

The reservoir 21 has an interior cavity 31 that is capable of containing a supply of water 33. Consequently, the reservoir 21 is water tight. In addition, the reservoir 21 is air tight.

The outlet of the regulator 29 is connected to an inlet port 35 of the reservoir 21 by way of a hose 37 or tubing. The hose 37 has a valve 39 therein for controlling the flow of compressed air into the reservoir.

In the embodiment shown in FIGS. 1 and 3, the misting system 11 is mounted underneath the roof or cover 41 of the vehicle 13. The roof 41 is supported by posts 43. The roof 41 is located over the passenger area (which has one or more seats 45) of the vehicle. The reservoir 21 is mounted to the roof 41 with brackets or straps (not shown). In other embodiments, the reservoir can be integrally molded into the roof. The air cylinder 19 is coupled to the reservoir 21 by straps 47. One wall 49 of the reservoir is contoured to fit around a portion of the air cylinder 19. The regulator and air pressure hoses are extended around a side of the reservoir. In FIG. 3, the regulator and air pressure hoses are shown on top of the reservoir for illustrative purposes.

The reservoir 21 also has a fill port 51 which is used to add water to the interior cavity. Preferably, a filter 53 is located in the fill port to remove any particles and/or debris from the water which might serve to clog the misting nozzles. The filter 53 can be replaced as needed. The fill port 51 has a cap 55 that provides an air tight seal.

The misting nozzles 23 are conventional and commercially available. The misting nozzles 23 are typically made of brass and are designed to produce a fine spray of mist. The water droplets in the mist produce evaporative cooling. The dispersal area can vary from nozzle to nozzle. For example, some nozzles emit one-half ounces of water per minute in a conical pattern that covers four square feet (at 45 psi), while other nozzles emit five ounces of water in a conical pattern that covers seven square feet (at 45 psi). Some misting nozzles come with a screw on/screw off valve. That is to say, to turn on a nozzle and permit mist production, the nozzle head is turned or rotated. To turn off the same nozzle, the nozzle head is turned in the opposite direction. For nozzles without such a built in valve, a valve is supplied in-line with the nozzle and the reservoir.

With two typical nozzles 23, two and a half gallons of water will last about three hours.

In the embodiment shown in FIG. 3, the misting nozzles 23 are directly mounted through a wall 57 of the reservoir. This eliminates the need for any hose or tubing between the reservoir and the misting nozzles. Because the reservoir shown in FIGS. 1 and 3 is mounted to the vehicle cover 41, the misting nozzles are located in the bottom wall 57 of the reservoir. The nozzles are mounted through the reservoir wall in a water tight manner, so that water is allowed to only flow through the nozzles.

The bottom wall 57 of the reservoir 21 can be contoured to provide a low area. Locating the misting nozzles in this low area ensures that water is provided to the misting nozzles, even when the water level in the reservoir is low and the vehicle is on a hill or otherwise tilted.

In operation, the air cylinder 19 and the air pressure valve 39 are both opened. This charges the reservoir 21 (which already contains water 33) with compressed air 59.

When a passenger or operator of the vehicle is hot, the misting nozzles are rotated open, wherein a fine mist 58 (see FIG. 1) is produced in the passenger vehicle compartment. The mist is directed down toward the vehicle occupants, hitting their heads first, then torsos and then legs. This produces maximum cooling to an occupant, as the cooling of the head is efficient in the cooling of the entire body.

Controlling the production of the mist can be accomplished in one of two ways. One way is to rotate each individual nozzle 23 on and off. Another way is to open and close the air pressure valve 39. This will produce a gradual slowing of the production of mist. As the air pressure inside of the reservoir lessens, the production of mist will decrease. To quickly stop the production of mist by controlling the air pressure, the water refill cap can be opened to bleed off compressed air from inside the reservoir.

Although the misting nozzles have been described as being mounted through the wall of the reservoir, other mounting arrangements are possible. For example, the misting nozzles can be mounted to the outside of the reservoir wall, with no penetration of the wall. A hose 61 (shown in dashed lines in FIG. 3) extends from an outlet port in the reservoir to the misting nozzles. An in-line valve 64 can be provided in the hose. Also, an inline water filter can be provided in the hose as an alternative to the filter in the fill port 51.

To refill the reservoir 21, the water fill cap 55 is removed and water is added to the reservoir, after which the cap is replaced. To provide additional compressed air, the empty air cylinder 19 is simply removed and replaced with a full air cylinder. The pressure gauge 27 provides an indication of how much air remains in the air cylinder.

Figure 4:
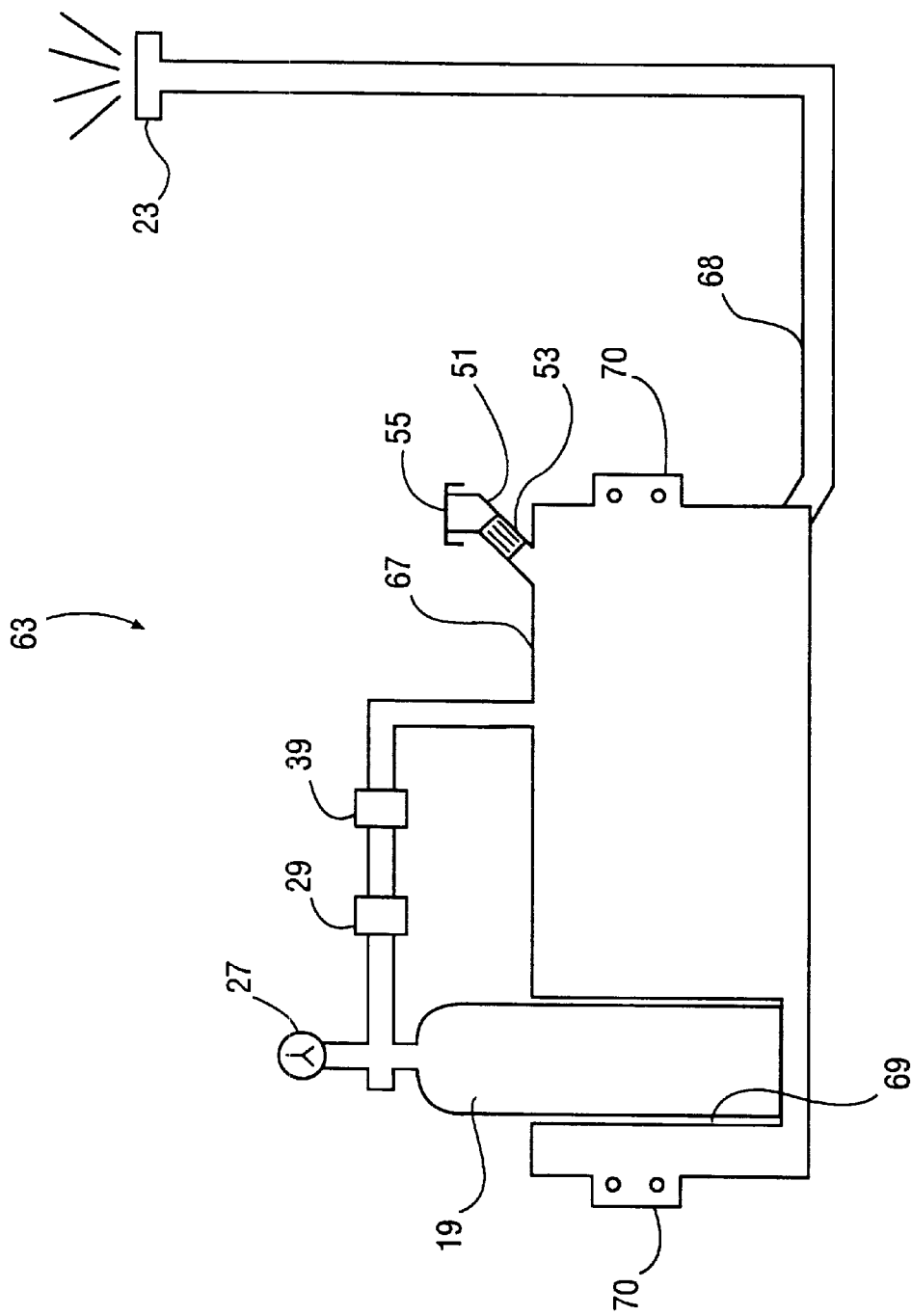
FIG. 4 is a schematic view of the misting system of FIG. 2.

FIGS. 2 and 4 show the misting system 63 in accordance with another embodiment. This misting system is designed to fit under the seat 45 of a vehicle 15. In many vehicles (for example golf carts) there is a cavity 65 or storage space located beneath the seat 45. The reservoir 67 is shaped to fit inside the cavity 65. The reservoir has a cylindrical cavity 69 in its outside wall to receive the air cylinder 19. Virtually the entire system is self contained in the storage space 65 under the seat, with the exception of hose 68 and the misting nozzles 23. The misting nozzles are located either under the roof, on a roof support or on a dashboard. The hose 68 connects the misting nozzles 23 to the reservoir 67. The reservoir 67 can be provided with mounting tabs 70 to assist in securing the reservoir to a wall of the storage space 65.

Figure 5:
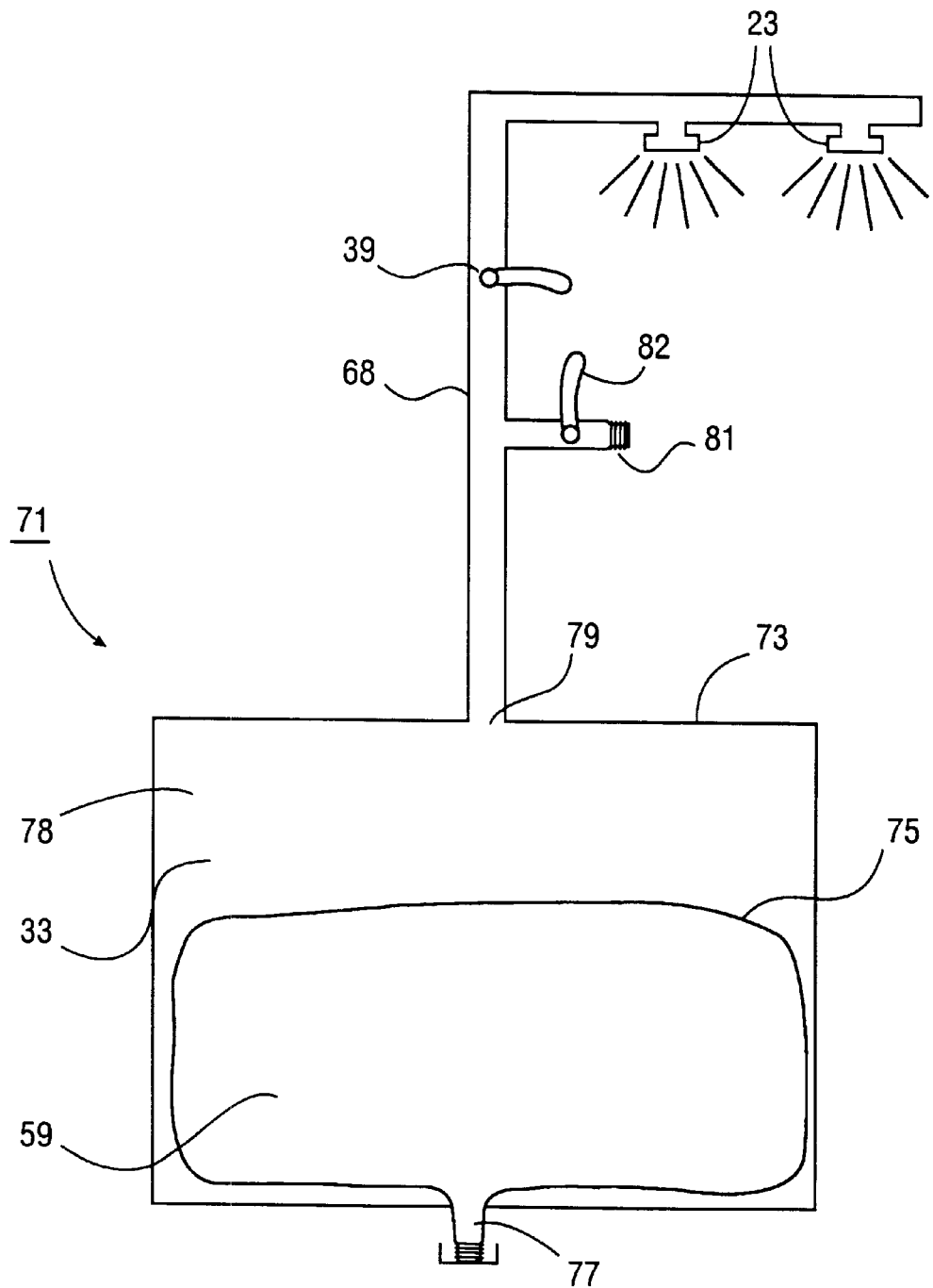
FIG. 5 is a schematic view of the misting system, in accordance with another embodiment.

FIG. 5 shows a misting system 71 in accordance with still another embodiment. The misting system 71 has a reservoir 73 that communicates with misting nozzles 23 via the hose 68. The reservoir contains an elastomeric bladder 75 or a diaphragm inside of the reservoir. The bladder 75 communicates with the exterior of the reservoir via an air port 77. The air port 77 has a valve, such as a Schroeder type valve. The water portion 78 of the reservoir has an outlet port 79 that is connected to the misting nozzles 23, either directly (where the nozzles are through the wall as shown in FIG. 2), or way of a hose 68 as shown in FIG. 4. There is a water inlet 81, either into the hose (with an on/off valve 82) or as a separate port in the reservoir. An in-line valve 29 controls water flow to the nozzles 23.

In operation, the reservoir 73 is partially filled with water through the water inlet. Then, the bladder 75 is pressurized with air from a source such as an air compressor. The water is incompressible because it is a liquid, however the air inside of the bladder is pressurized (for example 40–80 psi).

When the valve is opened, the pressurized bladder forces water out through the hose and the misting nozzles 23, thereby producing a fine mist. As the water exits, the bladder 75 expands inside of the reservoir, thus taking the place of the displaced water.

An advantage of the misting system 71 of FIG. 5 is that the reservoir 73 need not be in any particular orientation. That is to say, the outlet port need not be located at the bottom of the reservoir. The bladder is capable of forcing water up and out through the outlet port.

Figure 5A:
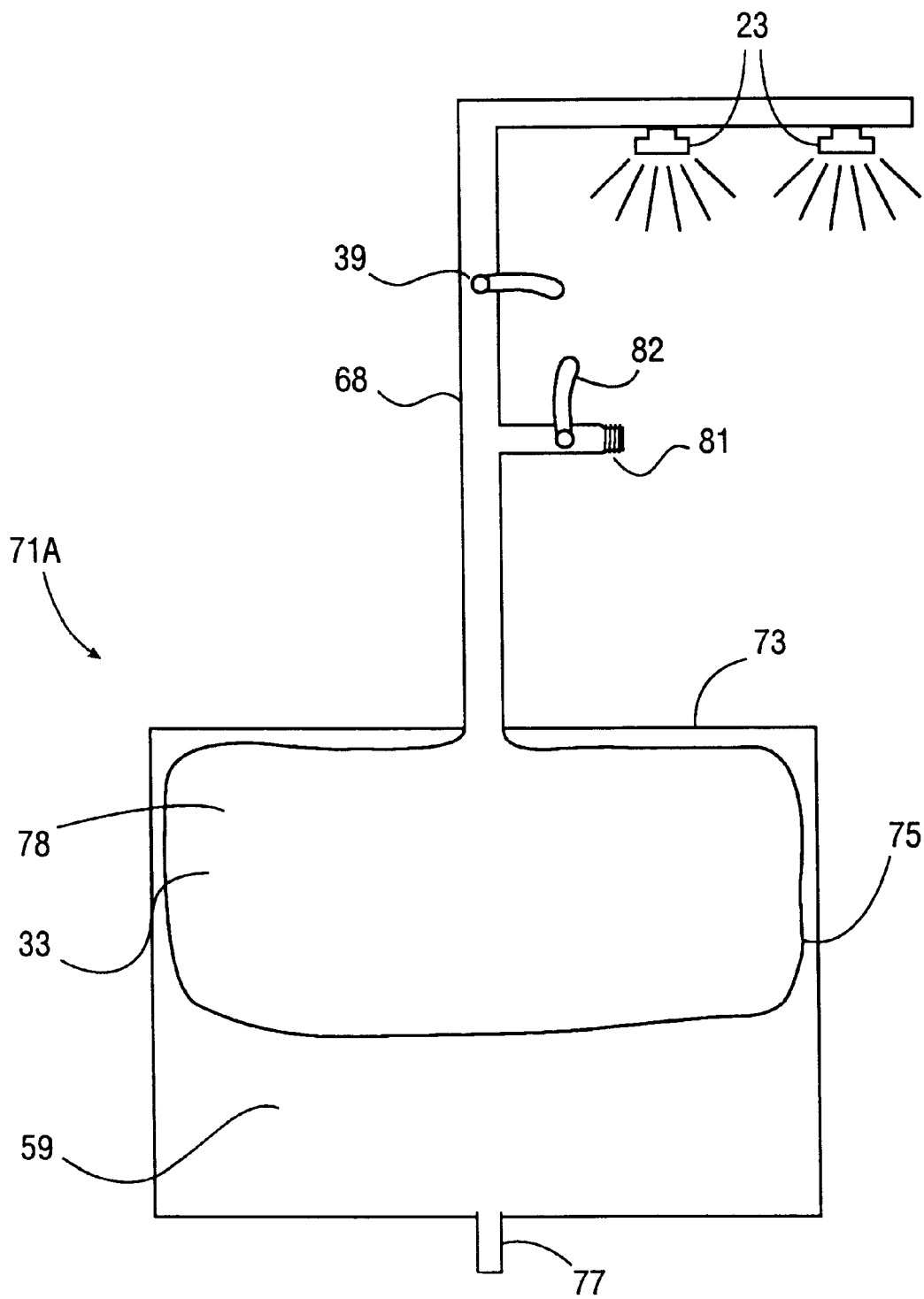
FIG. 5A is a schematic view of the misting system, in accordance with another embodiment.

As an alternative, the bladder 75 could be filled with water and the reservoir 73 filled with compressed air (see FIG. 5A). The line 68 of course is connected to the bladder 75. The advantage of this misting system 71A would be if the reservoir 73 was made of metal, then corrosion would be minimized. This is because the water would be confined within the bladder and out of contact with the walls of the reservoir.

FIGS. 6 and 7 show the misting system in accordance with another embodiment. The misting system is mounted on a push type lawn mower 17. The misting system 71 of FIG. 5 is ideally suited for such an application, where the space available is small and weight is a concern. An air cylinder or bottle, which is necessarily heavy, can be eliminated by the system 71 of FIG. 5.

The misting system is attached to the push handle 83 of the lawn mower 17. Preferably, the misting system is attached relatively low on the handle, to minimize the risk of tipping the mower. A hose 68 extends from the reservoir 73 up the handle 83 and beyond to form an extension. The hose 68 can be flexible and has one or more misting nozzles 23 therein. The production of mist is controlled by a valve.

The foregoing disclosure is merely illustrative of the principles of this invention and is not to be interpreted in a limiting sense.

What is claimed is:

1. A misting system for a vehicle, comprising:
    a) a supply of compressed gas, the supply of compressed gas further comprising a gas bottle;
    b) a reservoir that is capable of containing a supply of water, the reservoir coupled to the vehicle, the gas bottle being attached to the reservoir;
    c) a misting nozzle in fluid communication with the reservoir and located through a wall of the reservoir;
    d) a valve in fluid communication with the misting nozzle for controlling the flow of water through the misting nozzle;
    e) the compressed gas acting on the water in the reservoir so as to expel some of the water going through the misting nozzle when the valve is opened.

2. The misting system of claim 1 wherein the reservoir comprises rigid walls.

3. The misting system of claim 1 further comprising an air pressure regulator located between the supply of compressed gas and the reservoir.

4. The misting system of claim 1 wherein the reservoir has a fill port for adding water thereto, further comprising a filter located in the fill port.

5. The misting system of claim 1 wherein the vehicle is a golf cart.

6. The misting system of claim 1 wherein the vehicle is a tractor.

7. The misting system of claim 1 wherein the vehicle is a push lawn mower.

8. A misting system for a vehicle, the vehicle comprising a passenger space and a canopy or roof covering the passenger space, comprising:
    a) a reservoir that is capable of containing a supply of water, the reservoir being located underneath the canopy and above the passenger space, the reservoir has a wall;
    b) a misting nozzle located so as to direct a mist of water onto the passenger space, the misting nozzle being in fluid communication with the reservoir and being located in the reservoir wall so as to penetrate the wall;
    c) a supply of compressed gas being in fluid communication with the reservoir so as to force water in the reservoir out through the misting nozzle.

9. A misting system for a vehicle, comprising:
    a) a reservoir that is capable of containing a supply of water, the reservoir coupled to the vehicle;
    b) a misting nozzle in fluid communication with the reservoir;
    c) an elastomeric diaphragm located inside of the reservoir that forms a sealed chamber capable of containing compressed gas therein, the diaphragm being expandable and contractable to fill varying volumes within the reservoir;
    d) an air port through an outside wall of the reservoir, the air port communicating with the sealed chamber.

\* \* \* \* \*